(12) United States Patent
Mao

(10) Patent No.: US 10,931,102 B2
(45) Date of Patent: Feb. 23, 2021

(54) HARDWARE CONTROL FOR PREVENTION OF DANGEROUS RESTART IN A POWER TOOL

(71) Applicant: Black & Decker Inc., New Britain, CT (US)

(72) Inventor: Yanwen Mao, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 199 days.

(21) Appl. No.: 16/059,373

(22) Filed: Aug. 9, 2018

(65) Prior Publication Data

US 2019/0052077 A1 Feb. 14, 2019

Related U.S. Application Data

(60) Provisional application No. 62/544,304, filed on Aug. 11, 2017.

(51) Int. Cl.
| | | |
|---|---|---|
| *H02H 9/04* | (2006.01) | |
| *B25F 5/00* | (2006.01) | |
| *H02P 29/10* | (2016.01) | |
| *G06F 1/26* | (2006.01) | |
| *H02K 7/14* | (2006.01) | |

(Continued)

(52) U.S. Cl.
CPC ............... *H02H 9/04* (2013.01); *B25F 5/00* (2013.01); *B25F 5/001* (2013.01); *G06F 1/263* (2013.01); *H02H 3/247* (2013.01); *H02H 7/093* (2013.01); *H02K 7/145* (2013.01); *H02K 11/33* (2016.01);

(Continued)

(58) Field of Classification Search
CPC .......... H02H 9/04; H02H 3/247; H02H 7/093; H02K 11/33; H02K 7/145; H02P 29/10; H02P 3/22; H02P 6/08; H02P 25/10; B25F 5/00; B25F 5/001; G06F 1/263
See application file for complete search history.

(56) References Cited

U.S. PATENT DOCUMENTS

2004/0155529 A1 8/2004 Brotto
2019/0001479 A1* 1/2019 Yoshinari ................ H02P 27/06

FOREIGN PATENT DOCUMENTS

DE 102009046116 A1 5/2011
DE 202014008083 U1 11/2014
(Continued)

OTHER PUBLICATIONS

EP ESSR, dated Dec. 14, 2018 issued in corresponding EP application No. 18188505.4.

Primary Examiner — Jue Zhang
(74) Attorney, Agent, or Firm — Amir Rohani

(57) ABSTRACT

A power tool is provided including a power supply interface having a first node and a second node, a power switch circuit, an input unit actuatable by a user, a controller configured to control the power switch circuit to regulate the supply of electric power, and a driver circuit disposed between the controller and the power switch circuit configured to receive control signals from the controller and drive the power switch circuit according. A no-volt prevention circuit is configured to enable a supply of power to at least one of the driver circuit or the controller when the input unit is actuated after the power supply interface is coupled to the power supply, but not when the input unit is actuated before to the power supply interface is coupled to the power supply.

14 Claims, 12 Drawing Sheets

(51) Int. Cl.
  *H02P 6/08* (2016.01)
  *H02P 25/10* (2006.01)
  *H02K 11/33* (2016.01)
  *H02H 3/247* (2006.01)
  *H02H 7/093* (2006.01)
  *H02P 3/22* (2006.01)

(52) U.S. Cl.
  CPC ............... *H02P 3/22* (2013.01); *H02P 6/08* (2013.01); *H02P 25/10* (2013.01); *H02P 29/10* (2016.02)

(56) References Cited

FOREIGN PATENT DOCUMENTS

| EP | 2886262 | A2 | 6/2015 |
| EP | 3330046 | A1 | 6/2018 |

* cited by examiner

HARDWARE CONTROL FOR PREVENTION OF DANGEROUS RESTART IN A POWER TOOL

RELATED APPLICATION

This patent application claims the benefit of U.S. Provisional Patent Application No. 62/544,304, filed Aug. 11, 2017, content of which is incorporated herein by reference in its entirety.

FIELD OF THE DISCLOSURE

This disclosure relates to a power tool, and in particular to a control system and device for prevention of a dangerous restart in a power tool that is in an ON state when supply of power is initiated.

BACKGROUND

Many regulatory standards require power tools to be provided with a "no-volt release" feature. This feature prevents a power tool from operating when it is coupled to a power source when the tool's power switch is in an ON position. For example, if the power cord of a corded tool is plugged into an AC power output, or a battery pack is plugged into a battery receptacle of a cordless power tool, while the tool trigger is pressed or its ON switch is activate, this feature prevents the tool from turning ON.

U.S. Pat. No. 9,071,188, which is incorporated herein by reference in its entirety, discloses a no-volt release feature for a corded power tool having a universal motor. In this disclosure, a controller monitors the voltage across a triac switch coupled to the motor to determine presence of a no-volt condition and shuts off the triac upon detection of such a condition. As more power tools use brushless DC (BLDC) motors in place of universal motors, implementations are needed to replace such conventional no-volt release features.

US Patent Publication No. 2017/0373615, which is incorporated herein by reference in its entirety, discloses a no-volt release feature for a cordless power tool having a brushless DC (BLDC) motor. In this disclosure, a controller utilizes a solenoid switch coupled in series to a semiconductor switch to prevent a no-volt condition. Use of solenoid switches is expensive and not practical particularly in compact power tools.

What is needed is a reliable no-volt prevention mechanism, preferably implement in hardware for increased dependability, that prevents the power tool from beginning to operate when the tool is coupled to a power supply while the tool's trigger switch or other input unit is actuated in order to avoid a tool restart dangerous to the user.

SUMMARY

According to an embodiment of the invention, a power tool is provided comprising a housing, a motor disposed within the housing, and a power supply interface arranged to receive electric power from a power supply, the power supply interface having a first node and a second node. A motor control circuit is configured to regulate supply of power from the power supply interface to the motor. An input unit is provided actuatable by a user for turning the supply of power from the power supply interface to the motor ON or OFF. In an embodiment, a no-volt prevention circuit is provided receiving a first voltage signal from the first node of the power supply interface and a second voltage signal from the input unit, the no-volt prevention circuit having a main semiconductor switch arranged on a current path from the power supply interface to at least one component of the motor control circuit, and a resistor-capacitor circuit coupled between a control node of the main semiconductor switch and at least one of the first voltage signal or the second voltage signal to turn the main semiconductor switch ON when the input unit is actuated after the power supply interface is coupled to the power supply, but not when the input unit is actuated before to the power supply interface is coupled to the power supply.

In an embodiment, the second voltage signal is active-low.

In an embodiment, the resistor-capacitor circuit includes a first resistor-capacitor circuit disposed between the first voltage signal and an input node of the main semiconductor switch, and a second resistor-capacitor circuit disposed between the second voltage signal and the control node of the main semiconductor switch.

In an embodiment, a control resistor is further disposed between the input node and the control node of the main semiconductor switch.

In an embodiment, the first resistor-capacitor circuit includes a time constant configured to control a flow of current through the control resistor based on if the first voltage signal is activated prior to or after the second voltage signal.

In an embodiment, when the input unit is actuated after the power supply interface is coupled to the power supply, current passing through the control resistor develops sufficient voltage at the control node of the main semiconductor switch to turn the main semiconductor switch ON, but when the input unit is actuated before to the power supply interface is coupled to the power supply, current passing through the control resistor does not develop sufficient voltage at the control node of the main semiconductor switch to turn the main semiconductor switch ON.

In an embodiment, a latch switch is coupled to the control node of the main semiconductor switch that keeps the main semiconductor switch ON once it is activated.

In an embodiment, a bypass switch is disposed across a resistor of the first resistor-capacitor circuit arranged to bypass the resistor after a start-up period following the main semiconductor switch being turned ON.

In an embodiment, the second voltage signal is active-high.

In an embodiment, a contact switch disposed on the current path from the power supply interface to the motor, the contact switch closing by actuation of the input unit, wherein the second voltage signal is coupled to an output of the contact switch.

In an embodiment, the first voltage signal is coupled to an input node of the main semiconductor switch and the resistor-capacitor circuit controls the control node of the main semiconductor switch.

In an embodiment, the resistor-capacitor circuit includes a boost capacitor coupled to the first voltage signal and the second voltage signal, wherein a control node of the main semiconductor switch is turned ON only when a charge of the boost capacitor exceeds a threshold.

In an embodiment, the resistor-capacitor circuit is configured so that the boost capacitor is charged when the input unit is actuated after the power supply interface is coupled to the power supply, but is not charged when the input unit is actuated before to the power supply interface is coupled to the power supply.

In an embodiment, a node between the boost capacitor and the first voltage signal includes a voltage level corresponding to a sum voltage of the boost capacitor and the first voltage signal is obtained, wherein the voltage level of the node is at a first voltage level when the input unit is actuated after the power supply interface is coupled to the power supply, and at a second voltage level when the input unit is actuated before to the power supply interface is coupled to the power supply, wherein the first voltage level is greater than the second voltage level.

In an embodiment, a control switch is coupled to the control node of the main semiconductor switch, and a zener diode disposed between the node and a control node of the control switch.

In an embodiment, the second voltage signal is coupled to an input node of the main semiconductor switch and the resistor-capacitor circuit controls the control node of the main semiconductor switch.

In an embodiment, a first control switch is coupled to the control node of the main semiconductor switch, and a control resistor disposed between the input node and the control node of the main semiconductor switch.

In an embodiment, the first voltage signal charges a capacitor of the resistor-capacitor circuit and activates the first control switch so as to turn the main semiconductor switch ON when the power supply interface is coupled to the power supply before the input unit is actuated.

In an embodiment, a second control switch is coupled in parallel to the capacitor of the resistor-capacitor circuit. In an embodiment, the second control switch is configured to deactivate the first control switch when the input unit is actuated before the power supply interface is coupled to the power supply.

In an embodiment, a redundant no-volt prevention circuit disposed in series with the no-volt prevention circuit.

According to another embodiment of the invention, a power tool is provided including a housing, a motor disposed within the housing, and a power supply interface arranged to receive electric power from a power supply, the power supply interface having a first node and a second node. A power switch circuit is provided including a switching arrangement disposed on a current path from the power supply interface and configured to supply electric power to the motor. An input unit is provided actuatable by a user and configured to turn the supply of electric power from the power supply interface to the motor ON or OFF. A controller is provided and configured to control the power switch circuit to regulate the supply of electric power to the motor. Further, a driver circuit is disposed between the controller and the power switch circuit is provided and configured to receive a control signals from the controller and drive the switching arrangement according. In an embodiment, a no-volt prevention circuit configured to enable a supply of power to at least one of the driver circuit or the controller when the input unit is actuated after the power supply interface is coupled to the power supply, but not when the input unit is actuated before to the power supply interface is coupled to the power supply.

In an embodiment, a power supply regulator is provided having an input node, an output node, and an enable node arranged to enable or disable supply of power from the input node to the output node. In an embodiment, the no-volt prevention circuit is coupled to the enable node of the power supply regulator.

In an embodiment, the power supply regulator is arranged to supply power from the power supply interface to at least one of the controller or the driver circuit at a compatible voltage level.

In an embodiment, the no-volt prevention circuit is configured to receive a first voltage signal from the first node of the power supply interface and a second voltage signal from the input unit.

In an embodiment, the no-volt prevention circuit includes a first resistor-capacitor circuit associated with the first voltage signal and the input node of the power supply regulator, and a second resistor-capacitor circuit associated with the second voltage signal and the enable node of the power supply regulator. In an embodiment, the first resistor-capacitor circuit has a greater time constant than the second resistor-capacitor circuit.

In an embodiment, a main switch is disposed between the first voltage signal and the input node of the power supply regulator. In an embodiment, the first resistor-capacitor circuit is configured to control the main switch so as to activate the input node of the power supply regulated after a delay period after the power supply interface is coupled to the power supply.

In an embodiment, the second voltage signal is coupled to the enable node of the power supply regulator, and the second resistor-capacitor circuit is configured to limit an ON-time of the enable node of the power supply regulator after the input unit is activated.

In an embodiment, a disable switch is coupled to a node between the second voltage signal and the enable node of the power supply regulator. In an embodiment, the disable switch is configured to disable the enable node of the power supply regulator prior to an end of the delay period.

In an embodiment, a feedback signal is coupled to the node between the second voltage signal and the enable node of the power supply regulator.

According to another embodiment, a power tool is provided including a housing, a motor disposed within the housing, and a power supply interface arranged to receive electric power from a power supply, the power supply interface being coupled to a first voltage signal. A motor control circuit is configured to regulate supply of power from the power supply interface to the motor. An input unit is provided actuatable by a user and configured to turn the supply of electric power from the power supply interface to the motor ON or OFF, the input unit being coupled to a second voltage signal. A power supply regulator is disposed between the power supply interface and at least one component of the motor control circuit, the power supply regulator having an input node, an output node, and an enable node arranged to enable or disable supply of power from the input node to the output node. In an embodiment, a no-volt prevention circuit is provided including a first resistor-capacitor circuit associated with the first voltage signal and the input node of the power supply regulator, and a second resistor-capacitor circuit associated with the second voltage signal and the enable node of the power supply regulator. In an embodiment, the no-volt prevention circuit enables supply of power through the power supply interface when the input unit is actuated after the power supply interface is coupled to the power supply, but not when the input unit is actuated before to the power supply interface is coupled to the power supply.

In an embodiment, the first resistor-capacitor circuit has a greater time constant than the second resistor-capacitor circuit.

In an embodiment, a main switch is disposed between the first voltage signal and the input node of the power supply regulator. In an embodiment, the first resistor-capacitor circuit is configured to control the main switch so as to activate the input node of the power supply regulated after a delay period after the power supply interface is coupled to the power supply.

In an embodiment, the second voltage signal is coupled to the enable node of the power supply regulator, and the second resistor-capacitor circuit is configured to limit an ON-time of the enable node of the power supply regulator after the input unit is activated.

In an embodiment, a disable switch is coupled to a node between the second voltage signal and the enable node of the power supply regulator. In an embodiment, the disable switch is configured to disable the enable node of the power supply regulator prior to an end of the delay period.

In an embodiment, a feedback signal is coupled to the node between the second voltage signal and the enable node of the power supply regulator.

In an embodiment, the motor control circuit includes a power switch circuit including a switching arrangement disposed on a current path from the power supply interface and configured to supply electric power to the motor, a controller configured to control the power switch circuit to regulate the supply of electric power to the motor, and a driver circuit disposed between the controller and the power switch circuit configured to receive control signals from the controller and drive the switching arrangement accordingly. In an embodiment, the power supply regulator is configured to supply power from the power supply interface to at least one of the controller or the driver circuit at a compatible voltage level.

BRIEF DESCRIPTION OF THE DRAWINGS

The drawings described herein are for illustration purposes only and are not intended to limit the scope of this disclosure in any way.

Corresponding reference numerals indicate corresponding parts throughout the several views of the drawings.

DETAILED DESCRIPTION

Figure 1:
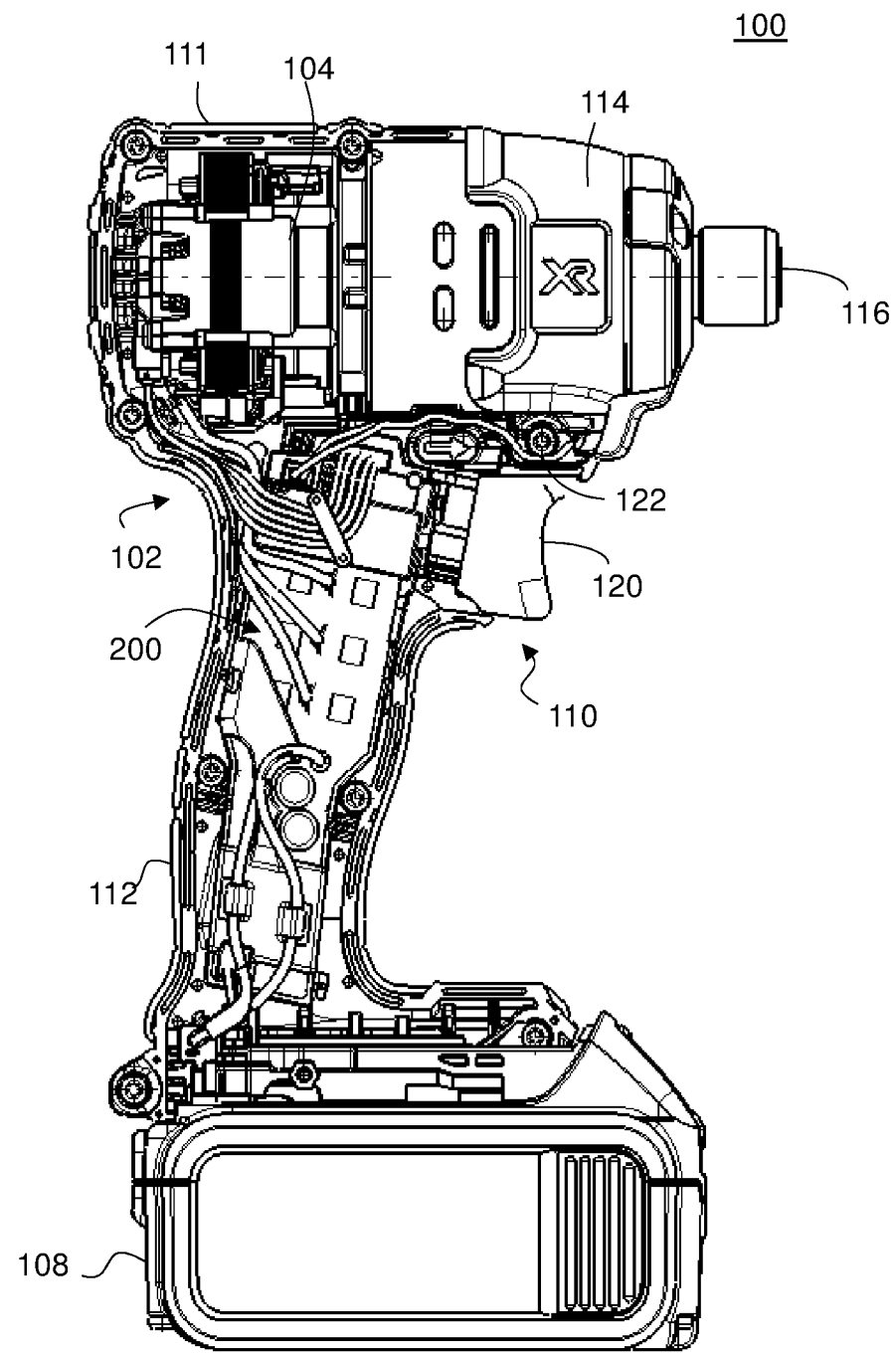
FIG. 1 depicts a side view of an exemplary power tool with tool housing partially removed, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

With reference to the FIG. 1, a power tool 100 constructed in accordance with the teachings of the present disclosure is illustrated in a longitudinal cross-section view. Power tool 100 in the particular example provided may be a hand held impact driver, but it will be appreciated that the teachings of this disclosure is merely exemplary and the power tool of this invention could be any power tool. The power tool shown in FIG. 1 may include a housing 102, an electric motor 104, a battery pack 108, a transmission assembly (gear case) 114, and an output spindle 116. The gear case 114 may be removably coupled to the housing 102. The housing 102 can define a motor housing 111 and a handle 112.

According to an embodiment, motor 104 is received in motor housing 111. Motor 104 maybe be any type of motor and may be powered by an appropriate power source (electricity, pneumatic power, hydraulic power). In an embodiment, the motor is a brushless DC electric motor and is powered by a battery pack 108.

According to an embodiment of the invention, power tool 100 further includes an integrated electronic switch and control module 200 (hereinafter referred to as "electronic control module", or "control module"). Electronic control module 200, in an embodiment, may include a controller and electronic switching components for regulating the supply of power from the battery pack 108 to motor 105. In an embodiment, electronic control module 200 is disposed within the handle 112 below the motor housing 111, though it must be understood that depend on the power tool shape and specifications, electronic control module 200 may be disposed at any location within the power tool. Electronic control module may also integrally include components to support a user-actuated input unit 110 (hereinafter referred to as "input unit" 110) for receiving user functions, such as an on/off signal, variable-speed signal, and forward-reverse signal. In an embodiment, input unit 100 may include a variable-speed trigger 120, although other input mechanism such as a touch-sensor, a capacitive-sensor, a speed dial, etc. may also be utilized. In an embodiment, an on/off signal is generated upon initial actuation of the variable-speed trigger 120. In an embodiment, a forward/reverse button 122 is additionally provided on the tool 100. The forward/reverse button 122 may be pressed on either side of the tool in a forward, locked, or reverse position. In an embodiment, the associated circuitry and components of the input unit 110 that support the variable-speed trigger 120 and the forward/reverse button 122 may be fully or at least partially integrated into the electronic control module 200. Based on the input signals from the input unit 110 and associated components, the controller and electronic switching components of the electronic control module 200 modulate and regulate the supply of power from the battery pack 108 to motor 105. Details of the electronic control module 200 are discussed later in detail.

While in this embodiment, the power source is battery pack 108, it is envisioned that the teachings of this disclosures may be applied to a power tool with an AC power source. Such a power tool may include, for example, a rectifier circuit coupled to the AC power source.

It must be understood that, while FIG. 1 illustrates a power tool impact driver having a brushless motor, the teachings of this disclosure may be used in any power tool, including, but not limited to, drills, saws, nailers, fasteners, impact wrenches, grinders, sanders, cutters, etc. Also, teachings of this disclosure may be used in any other type of tool or product that include a rotary electric motor, including, but not limited to, mowers, string trimmers, vacuums, blowers, sweepers, edgers, etc.

A detailed description of the mechanical aspects of the electronic control module 200 is beyond the scope of this disclosure. Examples of such a module may be found in co-pending patent application Ser. No. 15/603,837 filed May 24, 2017, the content of which is incorporated herein by reference in its entirety.

Figure 2:
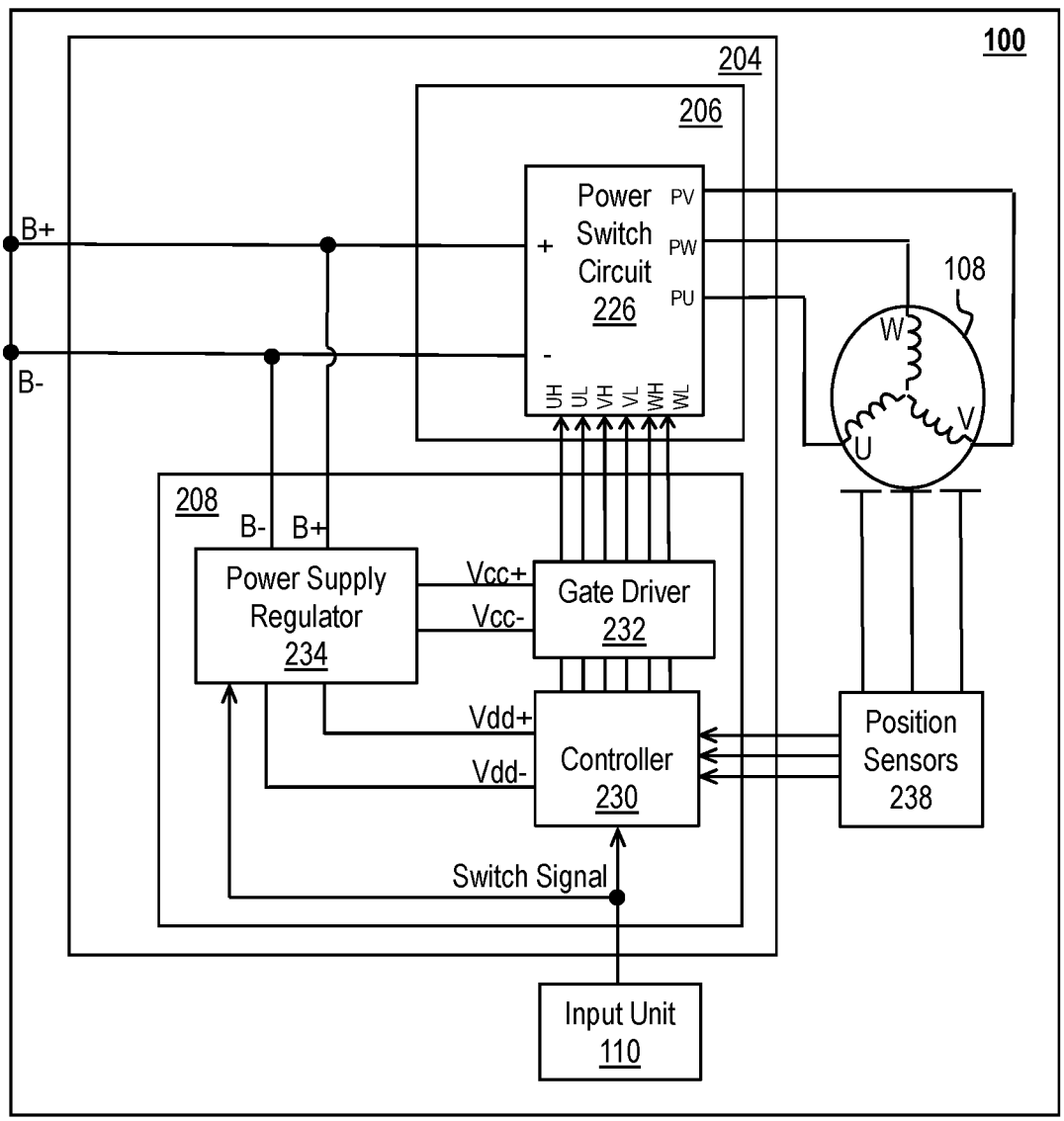
FIG. 2 depicts an exemplary block system diagram of the power tool including a motor and a motor control circuit, according to an embodiment.

Referring to FIG. 2 an exemplary circuit block diagram of power tool 100 including a motor 104 and a motor control circuit 204 is depicted, according to an embodiment. In an embodiment, motor control circuit 204 is provided as a part of the electronic control module 200, on a single printed circuit board, or on multiple circuit board electrically coupled together.

In an embodiment, motor 104 may be a brushless DC (BLDC) motor having a stator and a rotor. Examples of such a motor may be found in U.S. patent application Ser. No. 15/292,568 filed Oct. 13, 2016, content of which is incorporated herein by reference in its entirety.

In an embodiment, motor control circuit 204 includes a power unit 206 and a control unit 208. In FIG. 2, power tool 100 received DC power from a DC power source such as a battery pack via B+ and B− terminals.

In an embodiment, power unit 206 may include a power switch circuit 226 coupled between the power source B+/B− terminals and motor windings to drive BLDC motor 104. In an embodiment, power switch circuit 226 may be a three-phase bridge driver circuit including six controllable semiconductor power devices (e.g. FETs, BJTs, IGBTs, etc.).

In an embodiment, control unit 208 may include a controller 230, a gate driver 232, and a power supply regulator 234. In an embodiment, controller 230 is a programmable device arranged to control a switching operation of the power devices in power switching circuit 226. In an embodiment, controller 230 receives rotor rotational position signals from a set of position sensors 238 provided in close proximity to the motor 104 rotor. In an embodiment, position sensors 238 may be Hall sensors. It should be noted, however, that other types of positional sensors may be alternatively utilized. Controller 230 may also receive a variable-speed signal from variable-speed actuator or a speed-dial. Based on the rotor rotational position signals from the position sensors 238 and the variable-speed signal, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In an embodiment, power supply regulator 234 may include one or more voltage regulators to step down the power supply to a voltage level compatible for operating the controller 230 and/or the gate driver 232. In an embodiment, power supply regulator 234 may include a buck converter and/or a linear regulator to reduce the power voltage of battery down to, for example, 15V for powering the gate driver 232, and down to, for example, 3.2V for powering the controller 230.

In an embodiment, the electronic control module 200 may also include, integrally or separately from the motor control circuit 204, components and circuitry associated with the user-actuated input unit 110. Such components may detect a movement of the trigger 120 and initiate a signal to turn on the controller and other components of the electronic control module 200. In an example, as described in U.S. Pat. No. 9,508,498, content of which is incorporated herein by reference in its entirety, and shown in FIG. 3 herein, the electronic control module 200, particularly the input unit 110, may include a series of conductive pads 160, 162, coupled in series to resistors R0-R19 and R33, that output various voltages based on the position of a wiper coupled to the trigger 120. Upon initial engagement of the trigger switch, the WIPER output voltage signal exhibits a prescribed change in voltage that, though associated circuitry, couples the controller to battery power supply and turns the controller on.

Specifically, in an embodiment, conductive pad 162(19) is connected via a resistor R19 to a VDD node of the power supply regulator 234. Conductive pads 162(1)-(19) are used for variable-speed detection. Conductive pad 162(20) is connected to the battery terminal B+ through the input power terminals 106. Conductive pad 162(20) is used primarily for detecting when the trigger 120 is initially pressed by the user to issue an ON signal to the controller 230. Conductive pad 160(21) is electrically coupled to the WIPER signal. Conductive pad 160(21) is also electrically connected to one of the conductive pads 162(1)-(20) via a conductive wiper that slides over the conductive pads 162 (1)-(19). Based on the position of the trigger 120 and the conductive wiper, varying voltage levels are outputted on the WIPER signal. It is noted, whoever, that the initial. When the trigger 120 is initially pressed by the user, the WIPER signal is rapidly reduces from the pad 160(20) voltage level, which is approximately equivalent to the B+ voltage level, down to the pad 160(19) voltage level, which is approximately equivalent to the Vdd voltage level. This change in voltage is indicative of the initial actuation of the trigger 120 and is used to begin operating the power tool 100.

In an embodiment, a signal hereinafter referred to as the "Switch Signal" is generated that is indicative of the state of the trigger 120 or other on/off actuation mechanism. In an embodiment, the Switch Signal shown in FIG. 2 may be generated based on, or be directly electrically coupled to, the WIPER signal of FIG. 3. This arrangement generates an active-low Switch Signal, meaning that the voltage signal on Switch Signal is normally a high voltage (e.g., equivalent to the battery voltage), that changes to a lower voltage amount when the trigger 120 is pressed. It must be understood that use of conductive pads 160 and 162 for generating an active-low Switch Signal voltage is described herein by way of example, and an active-low Switch Signal may be generated using any other known method.

Figure 4:
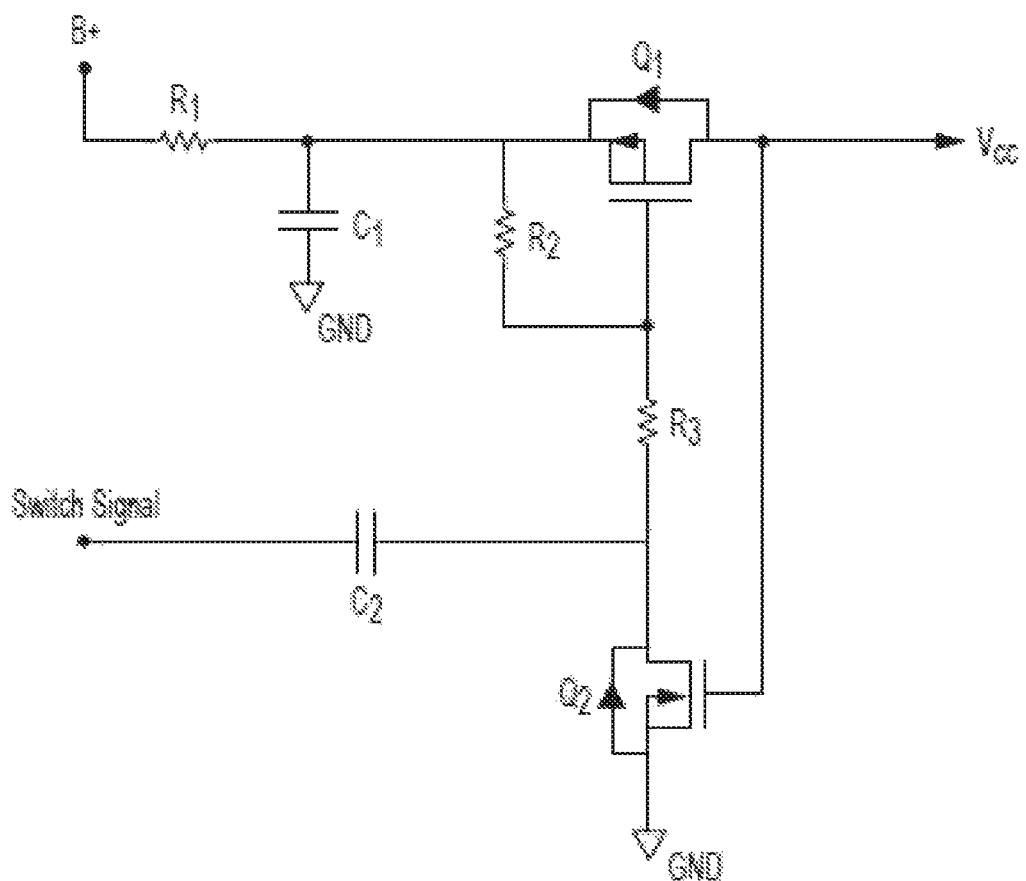
FIG. 4 depicts a partial circuit diagram of a first embodiment of a no-volt prevention circuit for prevention of a dangerous restart in the power tool, according to an embodiment.
Figure 5:
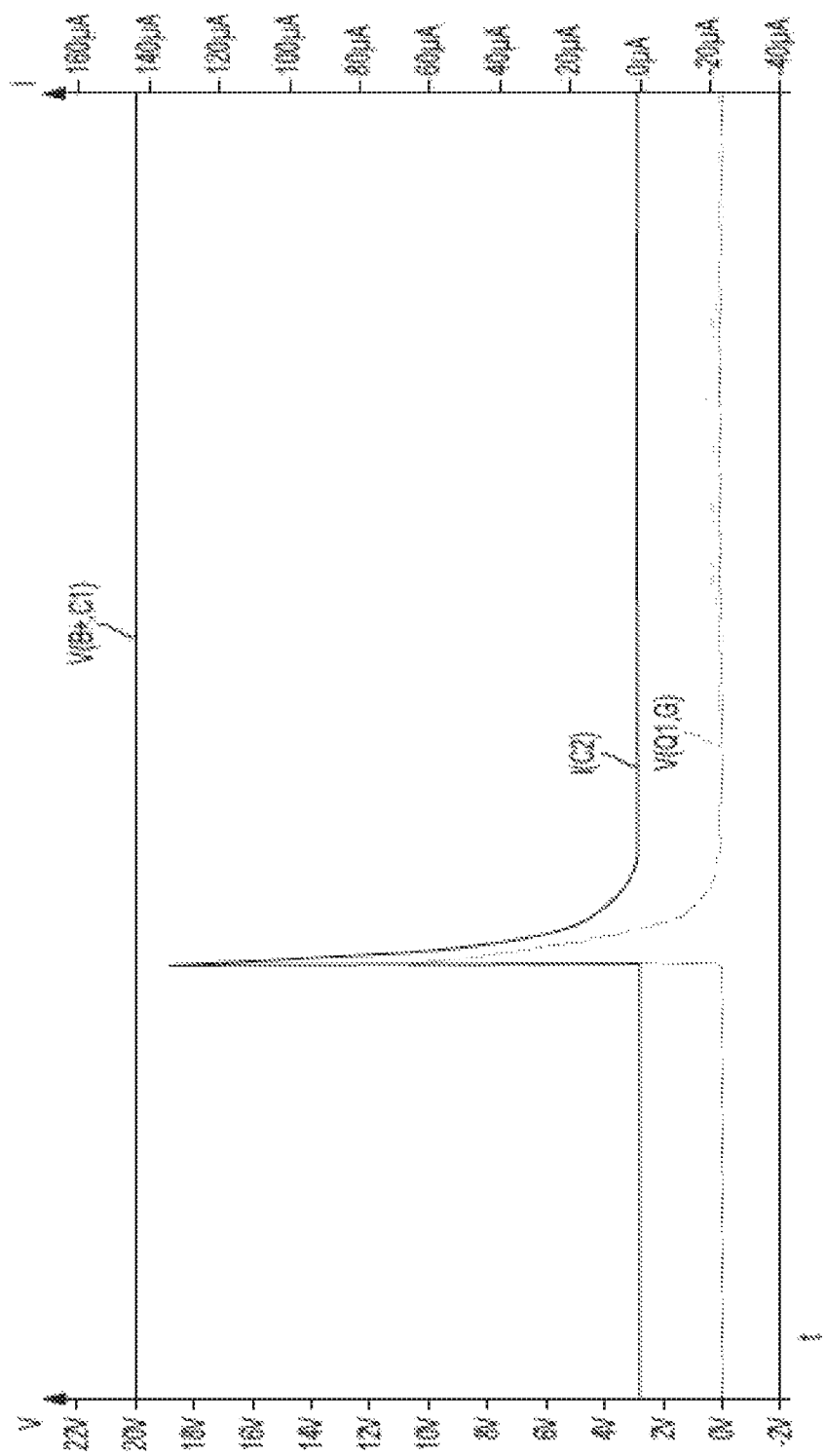
FIG. 5 depicts a combined voltage and current waveform diagram of various circuit components of the no-volt prevention circuit of FIG. 4 during normal conditions, according to an embodiment.
Figure 6:
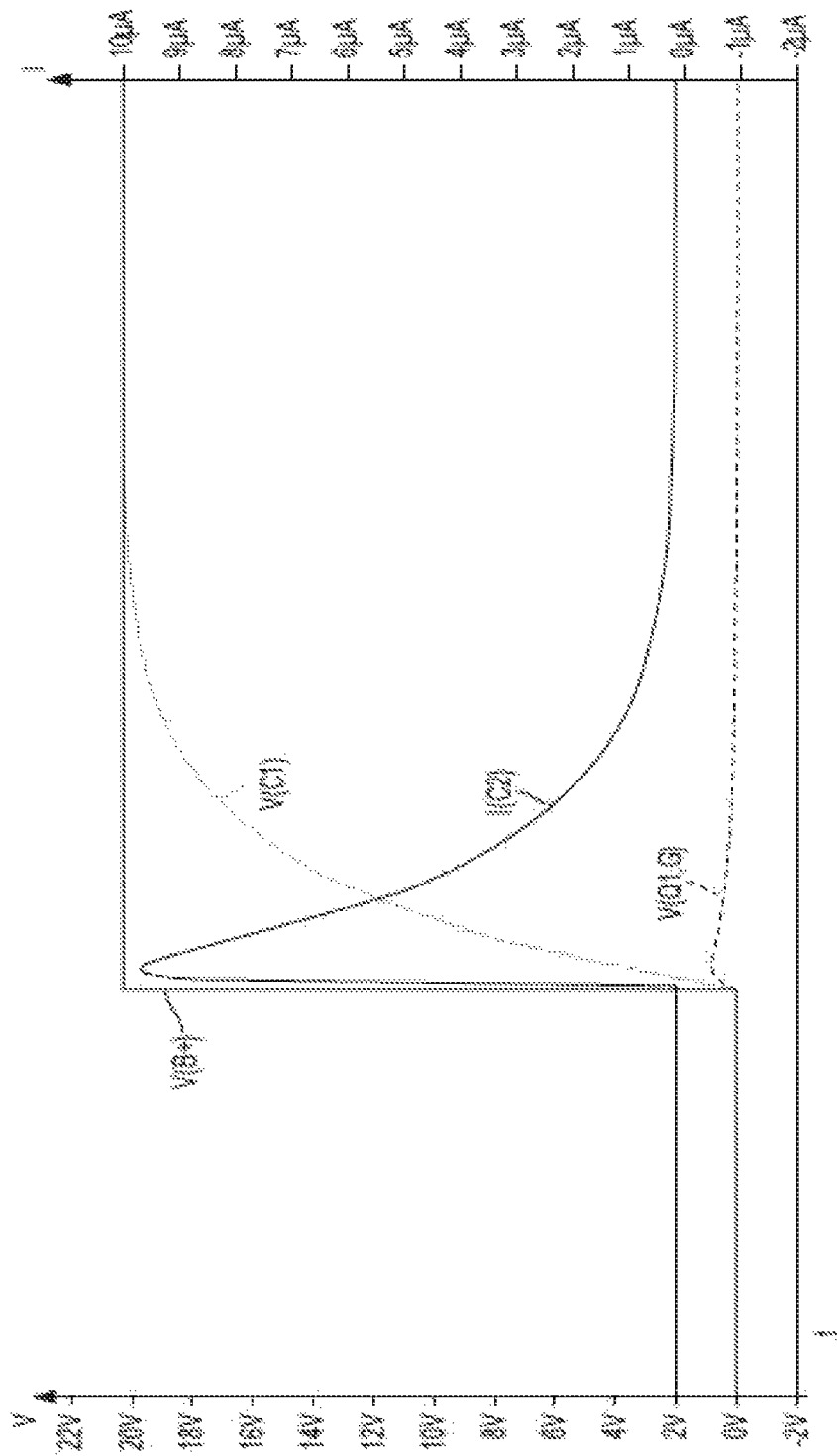
FIG. 6 depicts a combined voltage and current waveform diagram of various circuit components of the no-volt prevention circuit of FIG. 4 during a no-volt condition, according to an embodiment.

Referring now to FIG. 4-6, a first embodiment of a circuit diagram for prevention of dangerous restart is described herein. This embodiment relies on an active-low Switch Signal, as described above, and the B+ node of the power supply to prevent a dangerous restart condition from taking place when the power supply (e.g., battery pack) is plugged into the power tool 100 while the trigger 120 is pressed.

FIG. 4 depicts a partial circuit diagram of a no-volt prevention circuit 300, according to an embodiment. In an embodiment, this circuit may be provided as a part of power regulator 234 described above between the power supply battery node B+ and the power signal Vcc being provided to the controller 230. It should be understood, however, that the no-volt prevention circuit 300 may be provided at other parts of the circuit, e.g. between the power supply and the power supply regulator 234, between the power supply regulator 235 and the controller 230, or other suitable locations within the system.

In an embodiment, the no-volt prevention circuit 300 includes a main semiconductor switch Q1 disposed between the power supply node B+ and the output Vcc. The no-volt prevention circuit 300 relies on an R-C circuit to turn ON the main switch Q1 only when the Switch Signal is activated while battery power is being supplied through B+ (e.g., the trigger 120 is pressed while the battery pack is plugged into the power tool 100, herein referred to as the "normal condition"), but not when battery power is being supplied through B+ after the Switch Signal is already active (e.g., the battery is plugged in to the power tool 100 while the trigger 120 is pressed, herein referred to as the "no-volt condition").

In an embodiment, the no-volt prevention circuit 300 includes a first capacitor C1 and a first register R1 forming a series R1-C1 circuit between the B+ node and the source of the main switch Q1. A second resistor R2 (also referred to as a control resistor) also couples the source of the main switch Q1 to its gate. The Switch Signal is coupled to the gate of main switch Q1 via a third resistor R3 and a second capacitor C2. The R1-C1 circuit has a large enough resistance and/or capacitance to cause sufficient time delay in the charge time of the second capacitor C2 when the battery power supply through B+ is initiated. This delay results in low current passing through the second resistor R2

Referring to the waveform diagram of FIG. 5, and with continued reference to FIG. 4, in normal condition, i.e., when the Switch Signal is activated after battery power is already being supplied through B+, the battery power through the B+ node fully charges the first capacitor C1 through resistor R1 prior to the trigger 120 being pressed. In the illustrative example, where the battery has a 20V nominal voltage, the first capacitor C1 voltage is also charged to 20V. The gate of the main switch Q1, which is coupled to its source and to the first capacitor C1 via second resistor R2, has the same voltage potential. In an embodiment, main switch Q1 is a p-type solid state switch, and therefore remains OFF as long as its source to gate voltage potential remains below a gate threshold (e.g., 4V).

It is noted that the Switch Signal in this embodiment is active-low, meaning that it has a voltage equivalent to the battery voltage when the tool is off. Thus, no voltage developed across the second capacitor C2, and the second capacitor C2 remains unloaded, prior to trigger 120 being pressed.

Once the Switch Signal is activated (e.g. once the trigger 120 is pressed by the user) in normal condition, the voltage on the Switch Signal becomes low (i.e., to zero, or to a value significantly lower than the battery voltage), developing a voltage across the second capacitor C2 to charge the second capacitor C2. Since the first capacitor C1 is fully charged it does not affect the charging period of the second capacitor C2. Thus, the second capacitor C2 begins charging almost immediately, with the battery voltage flowing into the second capacitor C2 through the second resistor R2 and third resistor R3. This current, which is designated as I(C2) in FIG. 5, rapidly spikes (for example to 130 µA in the illustrative example), and gradually decreases as the C2 capacitor is charged. It is noted that C2 has a relatively small capacitance and therefore gets charged rather quickly. This large current spike through resistor R2 causes the source to gate voltage potential of the main switch Q1, which is designated as V (Q1, G) in FIG. 5, to increase from 0V to approximately 10V in the illustrative example, exceeding the main switch gate threshold. This turns ON the main switch Q1 long enough to activate a latch circuit including a latch switch Q2 that latches the main switch Q1 ON once it has been activated. In an embodiment, the latch switch Q2 is an n-type semiconductor switch that grounds the gate of the main switch Q1 when it is activated, thus keeping the main switch Q1 ON even after the second capacitor C2 is fully charged.

It is noted that the in the waveform diagram of FIG. 5, the source to gate voltage V (Q1, G) is depicted for a circuit with the latch switch Q2, for the purpose of illustrating the effect of the second capacitor C2 current on the main switch Q1.

Figure 3:
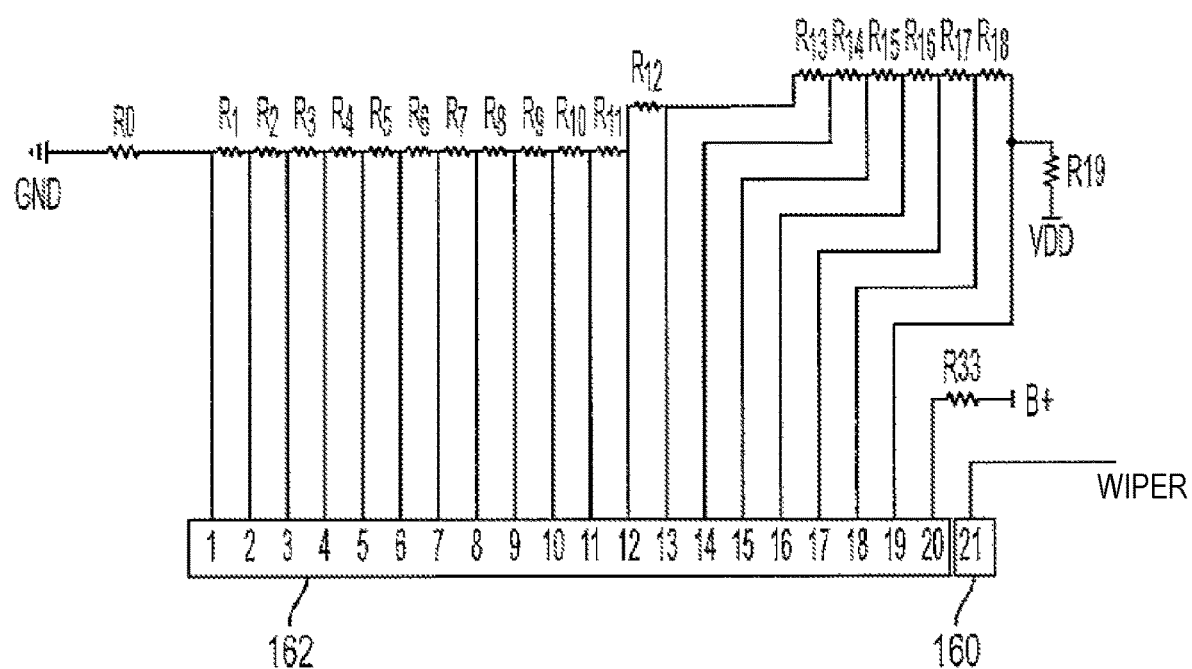
FIG. 3 depicts a partial circuit schematic diagram of an input unit of the power tool, according to an embodiment.

Referring now to the waveform diagram of FIG. 6, and with continued reference to FIG. 3, a no-volt condition, i.e., when battery power is being supplied through B+ after the trigger 120 is already pressed by the user, is described.

In a no-volt condition, prior to insertion of the battery pack, the first capacitor C1 is not yet charged. Once the battery pack is inserted, the first capacitor C1 begins to charge. Due to the high RC time constant of the R1-C1 circuit, the C1 capacitor takes a relatively long time to charge. For example, where the resistance of first resistor R1 is approximately 330 Ohms and the capacitance of first capacitor C1 is approximately 10 µF, the first capacitor C1 takes approximately 10 ms to fully charge to 20V. The charge time of the first capacitor C1 delays the rise time of the voltage across the second capacitor C2 and thus the current through the second resistor R2, which is designated as I(C2). Thus, the source to gate voltage of the main switch Q1, which is designated as V (Q1, S), never exceeds the gate threshold. This circuit thus prevents the main switch Q1 from turning ON in a no-volt condition.

In this manner, the no-volt prevention circuit 300 utilizes an RC circuit and a second capacitor C2 to control the current flow through the second resistor R2 disposed between the source and the gate of the main switch Q1. The current flow is controlled such that the main switch Q1 is turned ON only if the first capacity C1 is fully charged when the Switch Signal is activated (i.e., normal condition), but not when the first capacitor C1 is not charged when the Switch Signal is activated (i.e., no-volt condition). This arrangement prevents a dangerous restart condition implemented fully in hardware circuitry, without a need for additional software control or expensive hardware components.

Figure 7:
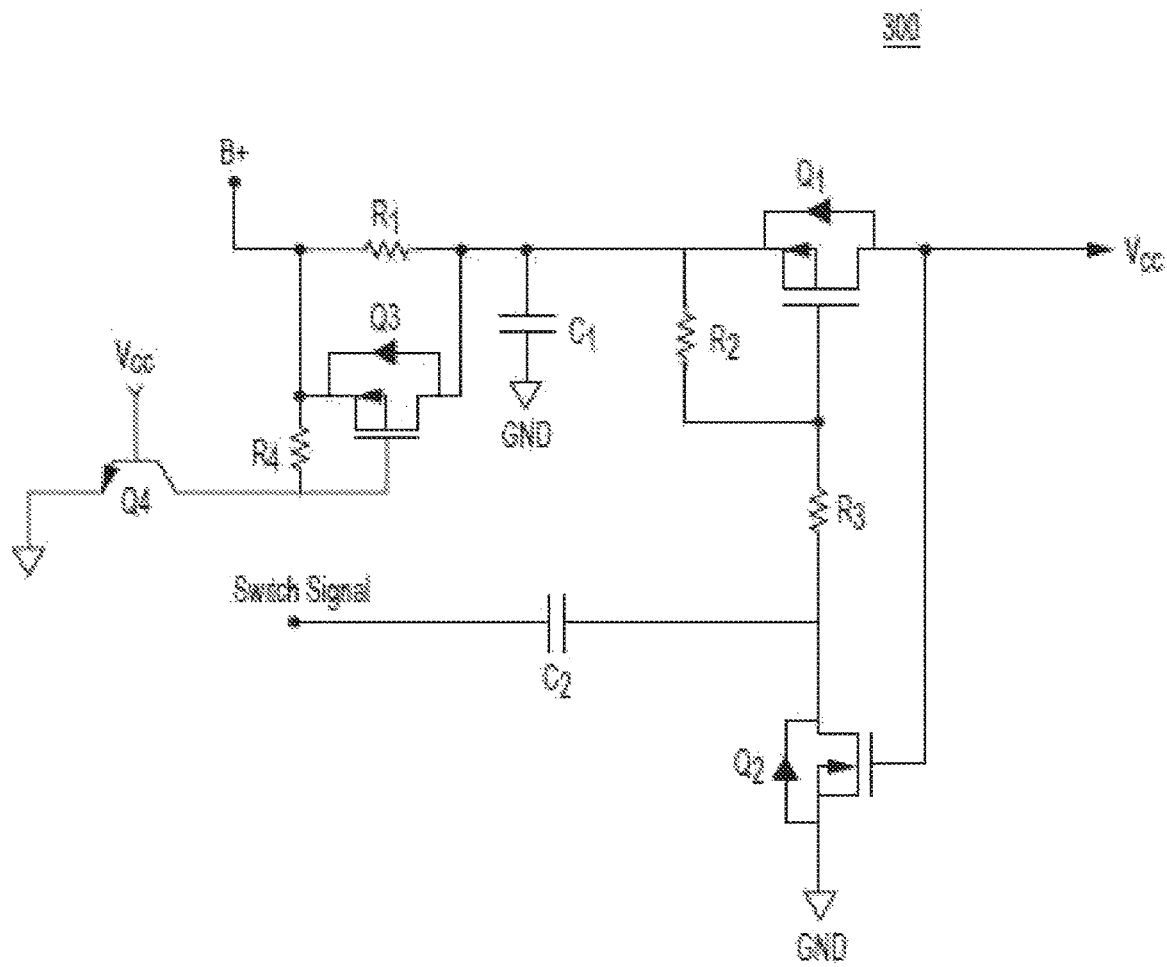
FIG. 7 depicts the no-volt prevention circuit diagram of FIG. 4 additionally provided with a bypass circuit, according to an embodiment.

FIG. 7 depicts the no-volt circuit diagram described above, additionally provided with a bypass circuit including a bypass switch Q3 disposed across the first resistor R1, a resistor R4 that couples the gate of the bypass switch Q3 to its source, and control switch Q4 that controls the gate of the bypass switch Q3, according to an embodiment. The control switch Q4, which in the illustrative example is a bipolar junction transistor (BJT), grounds the gate of the bypass switch Q3 when the Vcc signal becomes active. This turns ON the control switch Q4, which in this example is a P-type solid state switch, thus bypassing the first resistor R1 during the operation of the power tool. This arrangement ensures that the first resistor R1, which is relatively large, is used for initial tool start-up to prevent a dangerous no-volt restart, but is bypassed thereafter to prevent any related unnecessary power loss and/or voltage drop.

The exemplary embodiments described above are directed to an active-low Switch Signal. Alternatively, the Switch-Signal may be an active-high voltage signal, described below.

Figure 8:
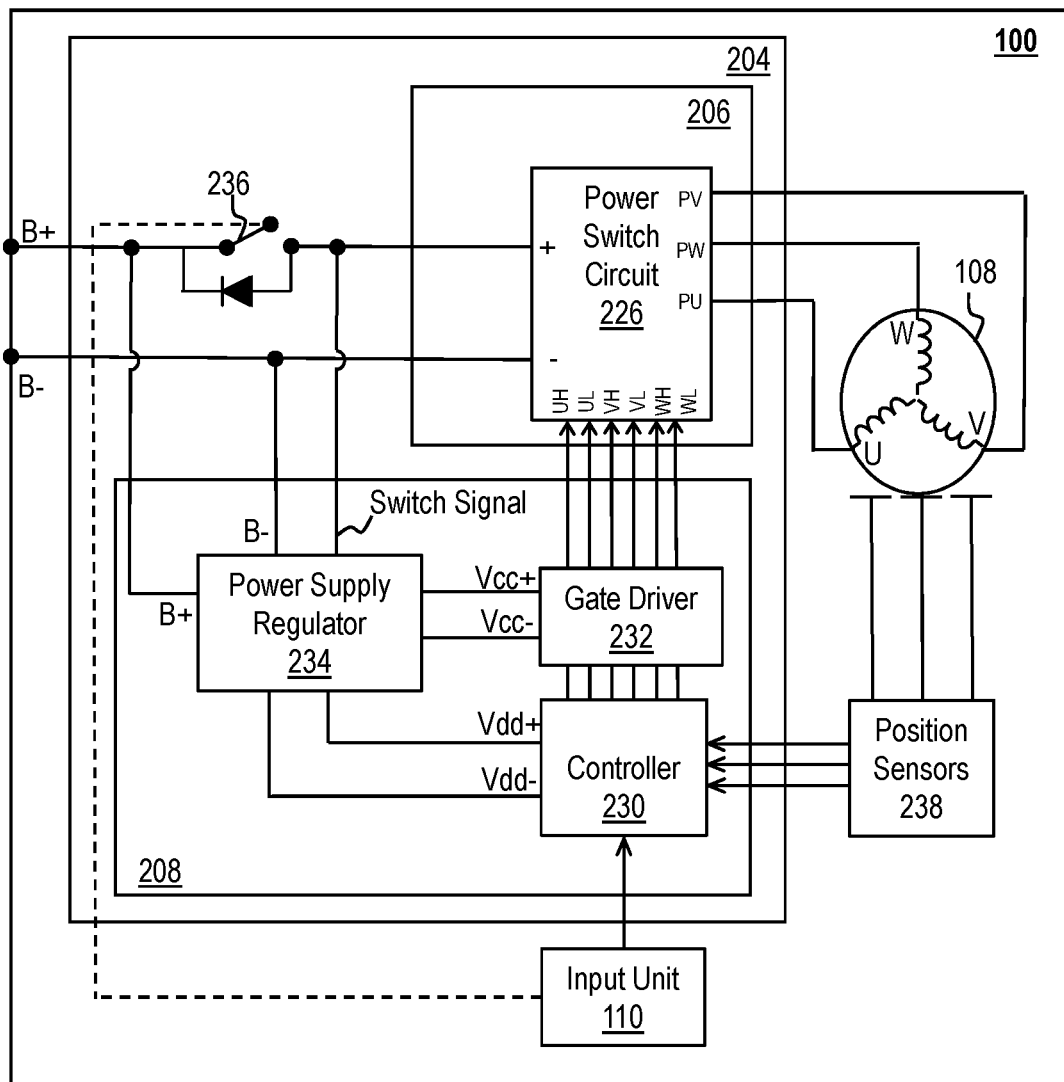
FIG. 8 depicts an exemplary block system diagram of the power tool including a motor and a motor control circuit, provided with a contact switch, according to an embodiment.

FIG. 8 depicts an exemplary circuit block diagram of power tool 100 including a motor 104 and a motor control circuit 204 are depicted, according to an embodiment. FIG. 8 is similar to the circuit block diagram of FIG. 2, but is additionally provided with a contact switch 236. Contact switch 236 may be a current-carrying mechanical ON/OFF switch coupled to the trigger 120 or the variable-speed actuator to allow the user to begin operating the motor 104, as discussed above. Contact switch 236 in this embodiment disables supply of power from the B+ node of the battery terminal to the power switch circuit 226. It is noted, however, that contact switch 236 may be provided at a different location, for example, between the B+ node and the power supply regulator 234, between the power supply regulator 234 and the gate drivers 232, etc. It is further noted that in an embodiment, power tool 100 may be provided without an ON/OFF contact switch 236, as described below.

In an embodiment, the Switch Signal is coupled to the output node of the contact switch 236, i.e., along the current path from the power supply to the power switch circuit 226. Accordingly, the voltage on the Switch Signal may be equivalent to the battery voltage B+ when the battery pack is received in the tool 100 and the contact switch 236 is closed. The Switch Signal is thus an active-high signal, meaning that is produces a high voltage when the trigger 120 is pressed (or the power tool 100 is otherwise turned on). It should be understood that the circuit diagram of the invention may be configured such that the voltage on the active-high Switch Signal is less than the B+ voltage.

Figure 9:
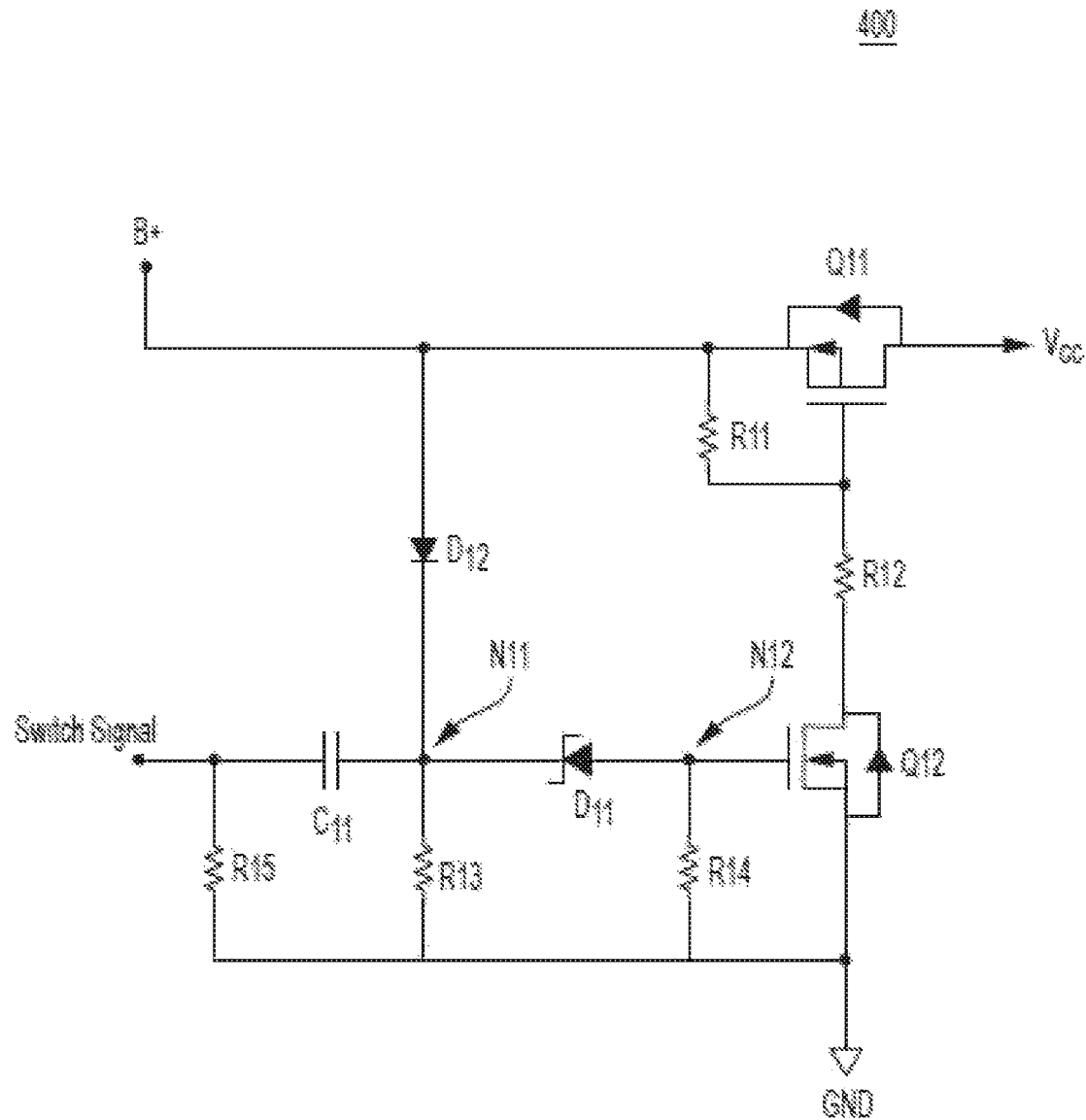
FIG. 9 depicts a partial circuit diagram of a second embodiment of a no-volt prevention circuit for prevention of a dangerous restart in the power tool, according to an embodiment.

Referring now to FIG. 9, a second embodiment of a circuit diagram for prevention of dangerous restart is described herein. This embodiment relies on an active-high Switch Signal, as described above, and the B+ node of the power supply to prevent a dangerous restart condition from taking place when the power supply (e.g., battery pack) is plugged into the power tool 100 while the trigger 120 is pressed.

FIG. 9 depicts a partial circuit diagram of a no-volt prevention circuit 400, according to this embodiment. Unlike the previous embodiment, where the RC circuit is used for time limiting the current flow, in this embodiment, a capacitor C11 is utilized as a boost capacitor ((also known as a stepper capacitor or a step-up capacitor), as described below. Additionally, in this embodiment, the Switch Signal is an active-high signal. In an embodiment, circuit 400 includes a main switch Q11 disposed between the power supply node B+ and the output Vcc. The source of the main switch Q11 is coupled to its gate via a first resistor R11 (also referred to as a control resistor). The gate of the main switch Q11 is further controllable via a control switch Q12 disposed between a ground node and the gate of the main switch Q11 through a second resistor R12. The gate of the control switch Q12 is controlled via the Switch Signal and the B+ node of the battery in a manner to prevent a no-volt condition, as described herein.

In an embodiment, a capacitor C11 is disposed along the Switch Signal line. A zener diode D11 is disposed between the capacitor C11 and the gate of the control switch Q12. Resistors R15, R13 and R14 couple the Switch Signal node, node N11 and node N12, as shown in circuit 400, to the ground. An additional diode D12 couples the battery node B+ to node N11.

During normal condition, i.e., when the Switch Signal is activated (e.g. by the user pressing the trigger 120) after battery power is already being supplied through B+, the battery power through the B+ charges the C11 capacitor prior to the Switch Signal being activated. For example, if the battery nominal voltage is 20V and the Switch Signal is 0V in the inactive mode, the capacitor C11 is charged to 20V prior to the Switch Signal being activated. Once the Switch Signal is activated (e.g., by the user pressing the trigger 120), the Switch Signal becomes high (e.g., 20V), and the voltage at node N11 becomes a sum of the Switch Signal and the capacitor voltage (e.g., 40V). The zener diode D11 has a large enough zener voltage (e.g., 25V) to conduct in reverse when the capacitor C11 is fully charged and the Switch Signal becomes active. With this arrangement, the voltage at node N12 becomes large enough (e.g., 40V−25V=15V) to turn ON the control switch Q12. The control switch Q12 subsequently grounds the gate of the main switch Q11, thus connecting the Vcc voltage output to the B+ node of the battery.

In a no-volt condition, i.e., when the battery pack is plugged into the power tool 100 while the trigger 120 is pressed, the capacitor C11 is not charged. This is because both the B+ terminal and the Switch Signal are at 0V prior to the battery pack being plugged it, and they both simultaneously increase to the battery voltage (e.g. 20V) once the battery pack is plugged in. Thus, the voltage at node N1 (e.g., 20V) does not exceed the zener diode D11 voltage (e.g., 25V), and the voltage at node N2 does not become high so as to turn on the control switch Q12 and, subsequently, the main switch Q11.

In this manner, the no-volt prevention circuit 400 utilizes a boost capacitor C11 to control the amount of voltage being applied to the gate of control switch Q12. The capacitor C11 is charged only during normal condition, but not when there is a no-volt condition. The state of charge of the capacitor C11 dictates whether control switch Q12, and subsequently the main switch Q11, turn ON to supply power from B+ to Vcc.

Figure 10:
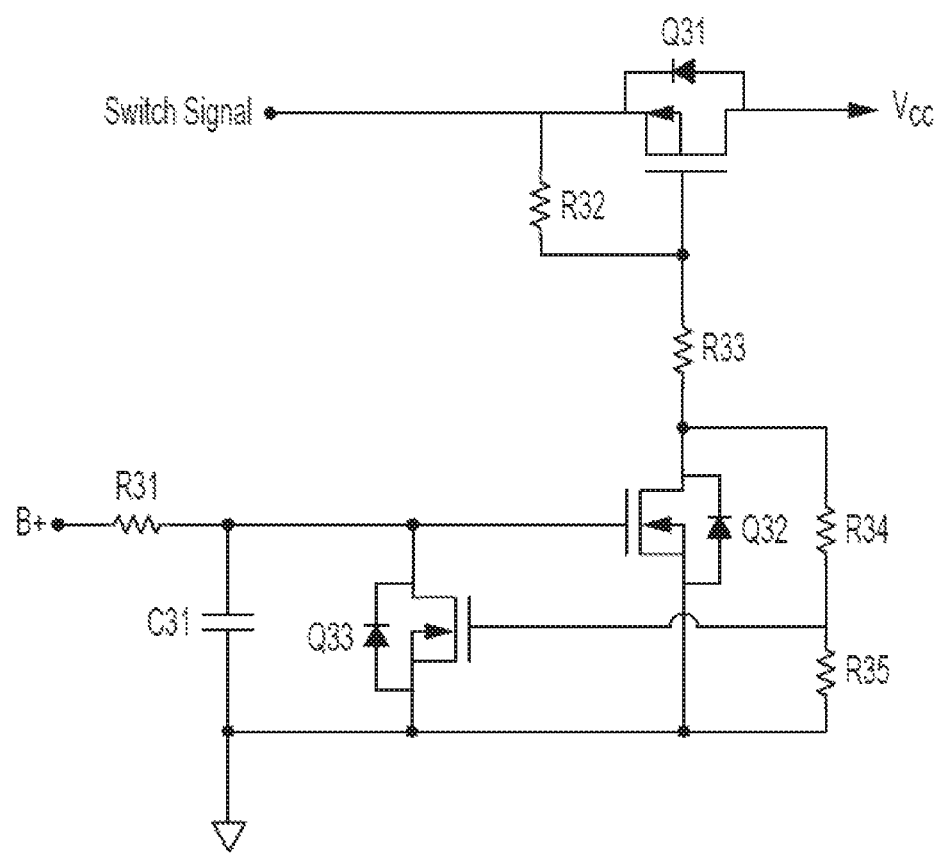
FIG. 10 depicts a partial circuit diagram of a third embodiment of a no-volt prevention circuit for prevention of a dangerous restart in the power tool, according to an embodiment.

Referring now to FIG. 10, a third embodiment of a circuit diagram for prevention of dangerous restart is described herein. This embodiment, similarly to FIG. 9 above, relies on an active-high Switch Signal, as previously described, and the B+ node of the power supply to prevent a dangerous restart condition from taking place when the power supply (e.g., battery pack) is plugged into the power tool 100 while the trigger 120 is pressed. Unlike the previous embodiment, where the B+ node is coupled to the source of the main switch and Switch Signal controls the gate of the main switch, in this embodiment, the B+ node controls the gate of the main switch and the Switch Signal is coupled to the source of the main switch.

FIG. 10 depicts a partial circuit diagram of a no-volt prevention circuit 500, according to this embodiment. This embodiment utilizes an RC circuit on the B+ current path to create a time delay for the B+. In this embodiment, the B+ signal activates a main switch Q31 disposed between the Switch Signal and the Vcc output in normal condition, but not in a no-volt condition.

Specifically, in an embodiment, first resistor R31 and capacitor C31 are disposed between the B+ node and a first control switch Q32. The Switch Signal is coupled to the gate of main switch Q31 via a second resistor R32 (also referred to as a control resistor). First control switch Q32 is also coupled to the gate of main switch Q31 via a third resistor R33. Switch Signal, via a current path through second resistor R32, third resistor R33, and a fourth resistor R34, controls the gate of a second control switch Q33. Second control switch Q33 switchably grounds the gate of the first control switch Q32.

In normal conditions, i.e., when the trigger 120 is pressed after the battery pack is plugged into the power tool 100, capacitor C31 is fully charged, and the B+ node turns ON the first control switch Q32. Switch Q32 in turn couples the gate of the main switch Q31 to ground. When the trigger 120 is pressed and Switch Signal becomes active, the source-to-gate voltage of the main switch Q31 exceeds its gate voltage threshold and turns it ON. Vcc is thus supplied power via the Switch Signal node, which is equivalent to the B+ voltage.

In a no-volt condition, i.e., when the battery pack is plugged into the power tool 100 while the trigger 120 is pressed, capacitor C31 is not yet charged. Once the battery is plugged in, both the B+ node and the Switch Signal node become high simultaneously. In the time it takes for capacitor C31 to charge, the Switch Signal turns ON the second control switch Q33 via the R32-R33-R34 current path, thus grounding the gate of the first control switch Q32. The B+ node therefore never activates the first control switch Q32 in this condition.

In an embodiment, the R31-C31 circuit should have a sufficiently large time constant to overcome the time delay caused by the R32-R33-R34 current path and the parasitic capacitance of the second control switch Q33. In an exemplary embodiment, the first resistor R31 has a resistance of approximately 6 M-Ohms and capacitor C31 has a capacitance of approximately 0.012 µF. Further, values of resistors R32-R35 should be selected appropriately for turning ON the main switch Q1 and second control switch Q33 as desired. In an exemplary embodiment, resistors R32-R35 respectively have resistances of approximately 60 kOhms, 180 kOhms, 5 MOhms, and 2 MOhms.

Figure 11:
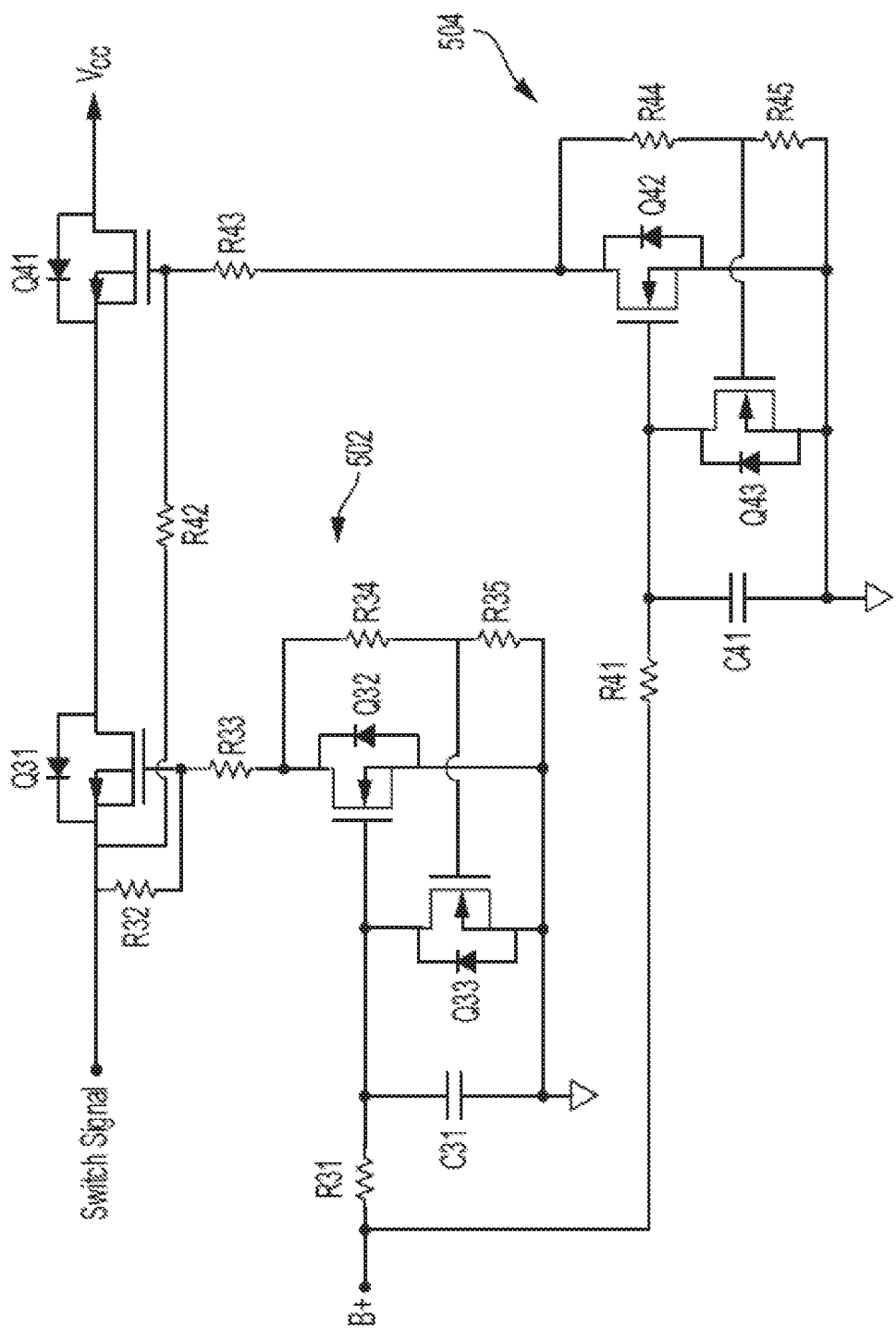
FIG. 11 depicts a circuit diagram of a redundant no-volt prevention circuit, according to an embodiment.

FIG. 11 depicts an exemplary circuit diagram of an exemplary circuit diagram for prevention of dangerous restart having redundant sub-circuits, according to a further embodiment of the invention. In this embodiment, two no-volt prevention sub-circuits 502, 504 are employed to activate two main switches Q31 and Q41 disposed in series on the power supply line to Vcc. Sub-circuits 502 and 504 have similar components configured as described above with reference to FIG. 10. It should be understood, however, that any of the previously described circuits may be similarly modified to include a secondary redundant circuit. This arrangement ensures that the no-volt prevention system does not fail as a result of a single component failure. It should be understood that while this redundant circuit employs the circuit diagram of FIG. 10 by way of example, the sub-circuits of this embodiment may be implemented in accordance with any of the embodiments of the invention described in this disclosure.

The embodiments described above with reference to FIGS. 8-11 use an active-high Switch Signal and the B+ voltage signal to prevent a dangerous restart of the power tool 100. In an embodiment, depending of the values of the resistors and capacitors in these circuits, a high voltage value (e.g., one that is equal to or substantially at the same level as the B+ voltage) may be needed.

Figure 12:
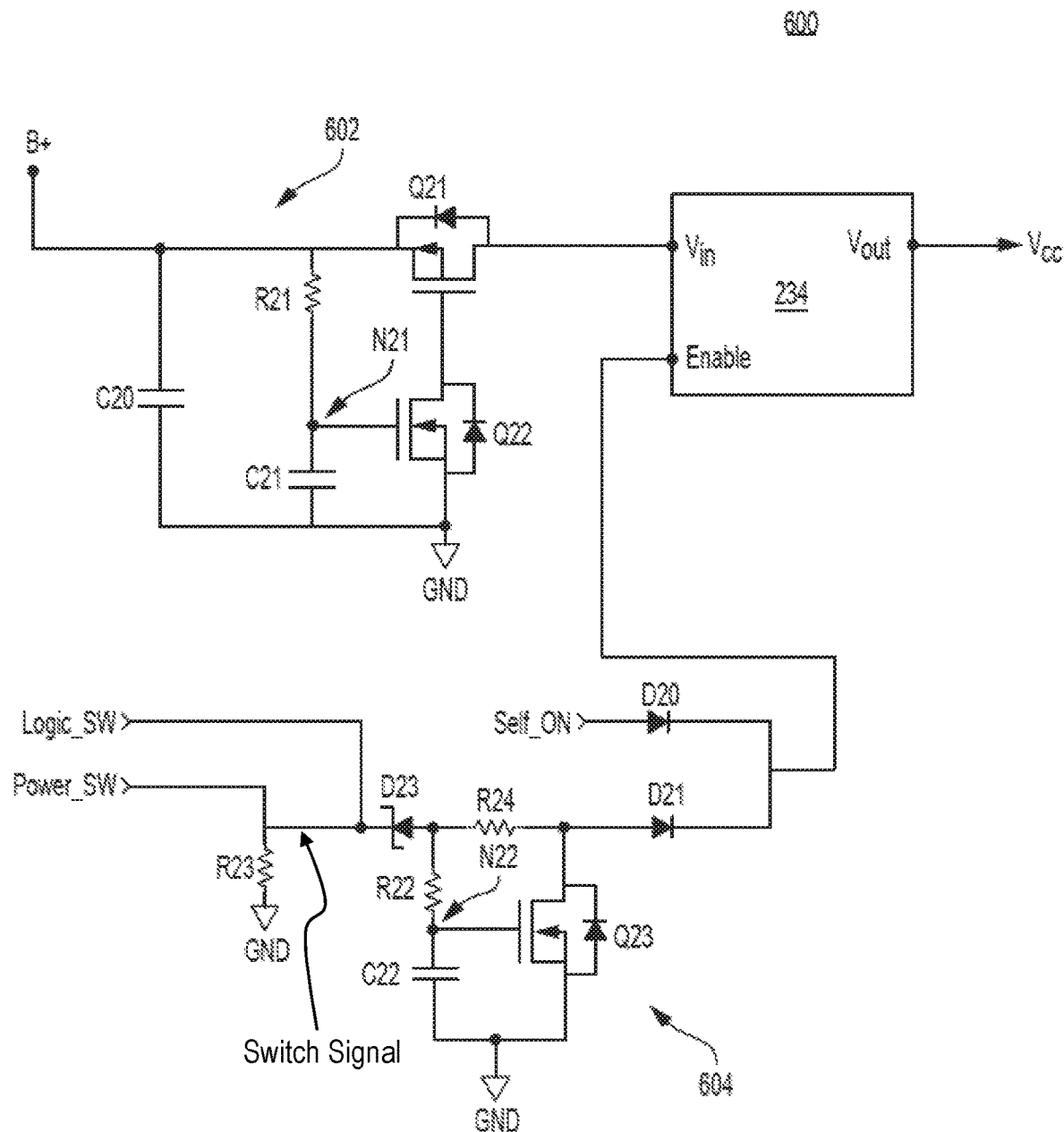
FIG. 12 depicts a partial circuit diagram of a fourth embodiment of a no-volt prevention circuit for prevention of a dangerous restart in the power tool, according to an embodiment.

Referring now to FIG. 12, a fourth embodiment of a circuit diagram for prevention of dangerous restart is described herein. This embodiment relies on an active-high Switch Signal and the B+ node of the power supply to prevent a dangerous restart condition from taking place when the power supply (e.g., battery pack) is plugged into the power tool 100 while the trigger 120 is pressed. In an embodiment, the active-high Switch Signal may be high voltage signal (e.g., one equal to or substantially at the same level as the B+ voltage) or a low voltage signal (e.g., one corresponding to the Vdd or Vcc voltage signals). In an embodiment, the Switch Signal is utilized to disable the voltage regulator 234 in the event of a no-volt condition.

FIG. 12 depicts a partial circuit diagram of a no-volt prevention circuit 600, according to this embodiment. In an embodiment, circuit 600 utilizes two RC circuits 602 and 604 having two different time constants to enable the voltage regulator 234 under normal condition, i.e., when the trigger 120 is pressed after the battery pack is plugged into the power tool, but disable the voltage regulator 234 in a no-volt condition, i.e., when the battery pack is plugged into the power tool 100 while the trigger 120 is pressed.

In an embodiment, first RC circuit 602 is provided on the current path of the battery power supply B+ to the $V_{in}$ input of the power supply regulator 234. First RC circuit 602 includes two capacitors C20 and C21 and a resistor R21 arranged as shown. Once the battery pack is plugged into the power tool 100, the capacitors C20 and C21 begin to charge. Once C21 is sufficiently charged so that the voltage at node N21 (between R21 and C21) exceeds the gate threshold of control switch Q22, control switch Q22 turns ON. Control switch 22 in turn grounds the gate of the main switch Q21 and turns it ON to connect the $V_{in}$ input of the power supply regulator 234 to the B+ battery terminal. In an exemplary embodiment, the C20/C21/R21 circuit delay the rise time of $V_{in}$ by approximately 20 to 60 ms, e.g., approximately 40 ms. In an embodiment, while C20 helps with the delay, C21 and R21 primarily determine the rising time of $V_{in}$.

In an embodiment, second RC circuit 604 is provided in relation to the current path of the Switch Signal to the 'Enable' input of the power supply regulator 234. In this embodiment, the Switch Signal may be an active-high, high-voltage signal (e.g., active at 20V when used with a 20V battery pack), designated as Power_SW. Such a signal may be obtained from a power contact switch (e.g., contact switch 236 in FIG. 8) disposed on the path of the power supply that closes when the tool trigger 120 is pressed, or the power tool 100 is otherwise turned on by the user. Alternatively, the Switch Signal may be an active-high low-voltage obtained from, for example, a logic switch or a wiper system that provides a low voltage signal (e.g., up to 5V) when activated. This signal is designated as Logic_SW. Once of the advantages of this embodiment is that the no-volt prevention circuit 600 may be utilized with either type of Switch Signal.

In an embodiment, once the Switch Signal (i.e., Logic_SW or Power_SW signal) is activated, it activates the 'enable' input of power supply regulator 234 through diode D21 momentarily until the second RC circuit 604 deactivates the 'enable' input of the power supply regulator 234. The 'enable' input of power supply regulator 234 is also driven via a Self_ON signal from the controller 230. Controller 230 activates the Self_ON signal when it is initially turned ON and keeps it ON for as long as it desires.

In an embodiment, second RC circuit 604 includes a resistor R22 and a capacitor C22 arranged as shown. Once C22 is sufficiently charged so that the voltage at node N22 (between R22 and C22) exceeds the gate threshold of a disable switch Q23, and the disable switch Q23 turns ON. The disable switch Q23 grounds the 'enable' input of the power supply regulator 234 through diode D21.

The second RC circuit 604 has a lower time constant than the first RC circuit 602. In an exemplary embodiment, the time delay caused by the R22/C22 circuit may be between 1 ms to 20 ms, e.g., 10 ms. Accordingly, the power supply regulator 234 is enabled through diode D21 for only approximately 10 ms before the disable switch Q23 grounds it.

In normal conditions, i.e., when the trigger 120 is pressed after the battery pack is plugged into the power tool 100, the first RC circuit 602 is initially fully charged and B+ node is coupled to the $V_{in}$ input of the power supply regulator 234. Once the trigger 120 is pressed, the Switch Signal (via Logic_SW or Power_SW signal) activates the 'Enable' input of the power supply regulator 234 for a very short time period (e.g., approximately 10 ms) until the disable switch Q23 grounds the input to diode D21. This short time period is sufficient, however, to power the controller 230, which in turn issues the Self_ON signal to continue to enable the power supply regulator 234 even after the disable switch Q23 is turned ON.

In a no-volt condition, i.e., when the battery pack is plugged into the power tool 100 while the trigger 120 is pressed, both RC circuits 602 and 604 begin to charge simultaneously. However, due to the larger time constant of the first RC circuit 602, the main switch Q21 is turned ON after the disable switch Q23 has grounded the 'Enable' input of the power supply regulator 234. Superficially, once the battery is plugged in, the Switch Signal (via Logic_SW or Power_SW signal) activates the 'Enable' input of the power supply regulator 234 for a short time period (e.g., 10 ms), but the main switch Q21 turns ON only after the expiration of that time period (e.g., after 40 ms). The power supply regulation 234 therefore does not supply power to Vcc under these conditions.

In an embodiment, Zener diode D23 and resistor R24 reduce the leakage current through the second RC circuit 604 in the event the trigger 120 is left depressed for an extended amount of time with the battery pack plugged in. Such leakage current path may be through resistor R24 and disable switch Q23. The Zener diode D23 cuts off the path of leakage current through these components.

In an embodiment, if the power supply regulator 234 is configured to output power only if the 'Enable' input is activated after the $V_{in}$ node, the second RC circuit 604 may be simplified and provided without the disable switch Q23.

While this embodiment utilizes the power supply regulator 234 to cut off supply of power by way of example, it should be noted that any circuit component that includes a control or 'Enable' input for activating or deactivating supply of power from an input node to an output node may alternatively be utilized.

For the purposes of this disclosure, it should be understood that the Switch Signal described in the above embodiments may be generated and configured in many variety of ways known in the art, so long as an active-high or an active-low signal is generated when the power tool is turned on via, e.g., an on/off switch, a switch knob, a trigger switch, or any other actuation mechanism engageable by the user for turning on the power tool. In this disclosure, reference is made to the event of a trigger 120 being pressed as merely an example of a method or mechanism for activating the Switch Signal.

It should be understood that while semiconductor switches described herein are Field-Effect Transistors (FETs) by way of example, the switches may be any other type of solid-state switch, such as Insulated-Gate Bipolar Transistors (IGBT), Bipolar Junction Transistors (BJT), etc. References made in this disclosure to a "gate," "source," or "drain" of such semiconductor switches should accordingly be understood to cover corresponding nodes (e.g., base, collector, emitter, etc.) of the semiconductor switch being utilized.

While this disclosure describes an electric handheld power tool by way of example, it should be understood that the teachings of this disclosure may apply to any electric device having a motor. Thus, the term "power tool" should not be interpreted as limited to drills, impact drivers, and other construction power apparatus.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A power tool comprising:
a housing;
a motor disposed within the housing;
a power supply interface arranged to receive electric power from a power supply;
a power switch circuit including a switching arrangement disposed on a current path from the power supply interface and configured to supply electric power to the motor;
an input unit configured to turn the supply of electric power from the power supply interface to the motor ON or OFF;
a controller configured to control the power switch circuit;
a driver circuit disposed between the controller and the power switch circuit configured to receive a plurality of control signals from the controller and drive the switching arrangement according;
a power supply regulator configured to supply power from the power supply interface to at least one of the controller or the driver circuit;
a main switch disposed between the power supply interface and the power supply regulator, wherein the main switch becomes closed at approximately a set time after the power supply interface is coupled to the power supply; and
a no-volt prevention circuit configured to enable a supply of power to at least one of the driver circuit or the controller in a normal condition where the input unit is actuated after the power supply interface is coupled to the power supply, but not in a no-volt condition where the input unit is actuated before to the power supply interface is coupled to the power supply,
wherein in the normal condition, the no-volt prevention circuit enables the power supply regulator after the main switch is closed, but in the no-volt condition, the no-volt prevention circuit enables and disables the power supply regulator after the power supply interface is coupled to the power supply but before the main switch is closed.

2. The power tool of claim 1, wherein the power supply regulator includes an input node, an output node, and an enable node arranged to enable or disable supply of power from the input node to the output node, wherein the no-volt prevention circuit is coupled to the enable node of the power supply regulator.

3. The power tool of claim 2, wherein the power supply regulator is arranged to supply the electric power from the power supply interface to at least one of the controller or the driver circuit at a compatible voltage level.

4. The power tool of claim 1, wherein the no-volt prevention circuit is configured to receive a first voltage signal from the power supply interface and a second voltage signal from the input unit.

5. The power tool of claim 4, the no-volt prevention circuit comprises a first resistor-capacitor circuit associated with the first voltage signal configured to close the main switch after a set time, and a second resistor-capacitor circuit associated with the second voltage signal configured to enable and disable the power supply regulator within the set time, wherein the first resistor-capacitor circuit has a greater time constant than the second resistor-capacitor circuit.

6. The power tool of claim 5, wherein the no-volt prevention circuit comprises a disable switch coupled to a node between the second voltage signal and the power supply regulator, wherein the disable switch is configured to disable the power supply regulator.

7. The power tool of claim 6, further comprising a feedback signal coupled to the node between the second voltage signal and the power supply regulator.

8. A power tool comprising:
a housing;
a motor disposed within the housing;
a power supply interface arranged to receive electric power from a power supply, the power supply interface coupled to a first voltage signal;
a motor control circuit configured to regulate supply of electric power from the power supply interface to the motor;
an input unit configured to turn the supply of electric power from the power supply interface to the motor ON or OFF, the input unit coupled to a second voltage signal;
a power supply regulator disposed between the power supply interface and at least one component of the motor control circuit, the power supply regulator having an input node, an output node, and an enable node arranged to enable or disable supply of power from the input node to the output node;
a main switch disposed between the power supply interface and the input node of the power supply regulator; and
a no-volt prevention circuit comprising a first resistor-capacitor circuit associated with the first voltage signal and configured to drive the main switch to control supply the electric power to the input node of the power supply regulator, and a second resistor-capacitor circuit associated with the second voltage signal and configured to drive the enable node of the power supply regulator independently of a state of the main switch, the no-volt prevention circuit enabling supply of power to the motor when the input unit is actuated after the power supply interface is coupled to the power supply, but not when the input unit is actuated before to the power supply interface is coupled to the power supply.

9. The power tool of claim 8, wherein the first resistor-capacitor circuit has a greater time constant than the second resistor-capacitor circuit.

10. The power tool of claim 9, wherein the second voltage signal is coupled to the enable node of the power supply regulator, and the second resistor-capacitor circuit is configured to limit an ON-time of the enable node of the power supply regulator after the input unit is activated.

11. The power tool of claim 10, further comprising a disable switch coupled to a node between the second voltage signal and the enable node of the power supply regulator, wherein the disable switch is configured to disable the enable node of the power supply regulator prior to an end of the delay period.

12. The power tool of claim 11, further comprising a feedback signal coupled to the node between the second voltage signal and the enable node of the power supply regulator.

13. The power tool of claim 8, wherein the first resistor-capacitor circuit is configured to control the main switch so as to activate the input node of the power supply regulated after a delay period after the power supply interface is coupled to the power supply.

14. The power tool of claim 8, wherein the motor control circuit comprises:
- a power switch circuit including a switching arrangement disposed on a current path from the power supply interface and configured to supply electric power to the motor;
- a controller configured to control the power switch circuit to regulate the supply of electric power to the motor; and
- a driver circuit disposed between the controller and the power switch circuit configured to receive a plurality of control signals from the controller and drive the switching arrangement accordingly;
- wherein the power supply regulator is configured to supply power from the power supply interface to at least one of the controller or the driver circuit at a compatible voltage level.

* * * * *